July 14, 1931.    S. G. ELLIS    1,814,674

STOCK WATERING TROUGH

Filed June 16, 1930

Inventor
Stanley G. Ellis
By C.A.Snow&Co.
Attorneys.

Patented July 14, 1931

1,814,674

UNITED STATES PATENT OFFICE

STANLEY G. ELLIS, OF HANNIBAL, MISSOURI

STOCK WATERING TROUGH

Application filed June 16, 1930. Serial No. 461,493.

This invention relates to stock watering troughs, the primary object of the invention being to provide a stock watering trough wherein the water in the trough proper, will be automatically replenished, when the trough becomes empty, thereby insuring a clean supply of water at all times.

Another important object of the invention is to provide a supply tank and a trough section pivotally mounted on the supply tank, means being provided for controlling the flow of water from the supply tank, by the movement of the trough.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
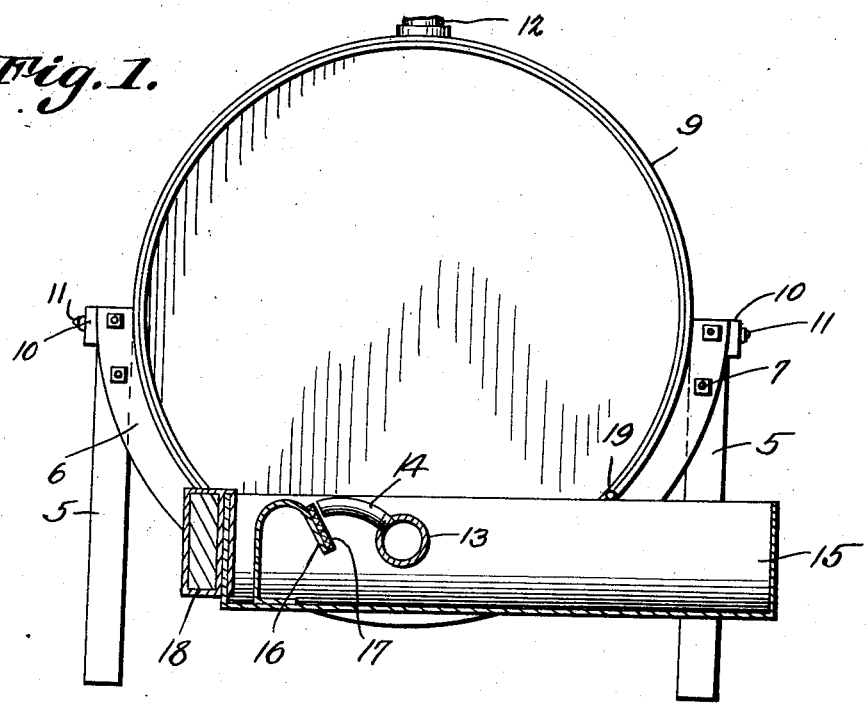
Figure 1 is an end elevational view of a stock watering trough constructed in accordance with the invention, the trough proper being shown in longitudinal section.
Figure 2:
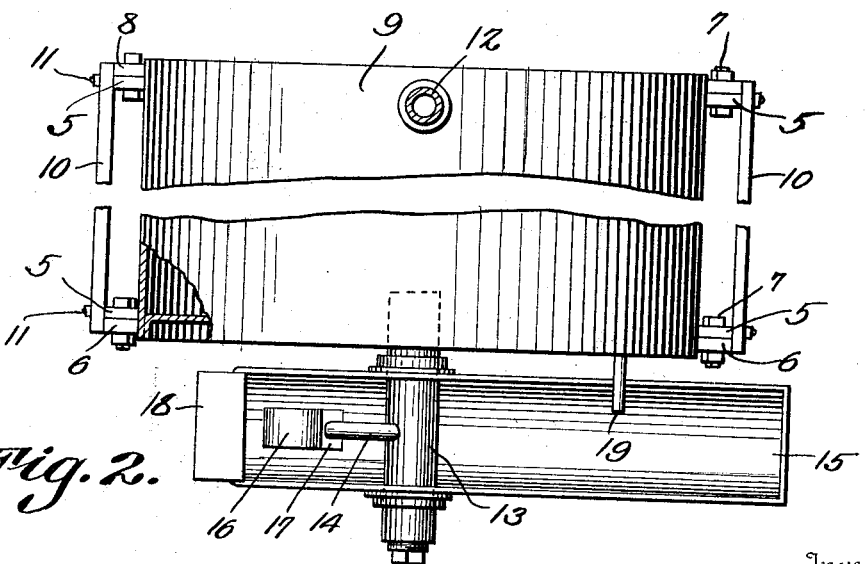
Figure 2 is a plan view of the stock watering trough.

Referring to the drawings in detail, the device comprises a supporting frame embodying leg members 5 arranged at the front and the rear of the frame, the leg members at the front of the frame being connected by means of the curved supporting bar 6, bolted to the leg members, by means of the bolts 7.

The rear leg members 5 are also connected by a curved supporting bar 8, the bars 6 and 8 providing a support for the supply tank 9, which is of a construction to closely fit within the bars 6 and 8, as clearly shown by Figure 1 of the drawings.

The front and rear leg members 5 at each side of the frame, are connected by means of bars 10, which are also secured by means of bolts 11. A pipe 12 extends into the supply tank 9, and provides means whereby water may be supplied to the tank 9. Extending into one end of the supply tank 9, is a pipe 13 that communicates with the interior of the tank, so that water may flow from the tank into the pipe 13.

The reference character 14 designates a curved pipe that extends into an opening of the pipe 13, the outer end of the pipe 14 being disposed at a point adjacent to the upper end of the trough 15 that is provided with openings to receive the pipe 13, to pivotally support the trough.

As shown, the trough 15 is mounted on the pipe 13 at a point near one end of the trough, so that when water passes into the trough 15, the weight of the water will act to overbalance the trough to cause one end of the trough to swing upwardly. Secured within the trough 15 is an arm 16 that is provided with a rubber facing strip 17 so positioned that it will engage the open end of the pipe 14, when the trough has become filled with water, to shut off the supply of water to the trough.

In order that the operation of the trough will be insured, a weight 18 is provided, the same being positioned at one end of the trough, to overbalance the trough when the supply of water in the trough 15 is exhausted.

In the operation of the device, the trough is moved to a position to cause the facing strip 17 to engage the discharge end of the pipe 14, when the trough 15 becomes filled, and when the trough 15 becomes empty, the weight 18 causes the trough to overbalance, moving the member 17 away from the pipe 14, allowing water to flow into the trough. As the trough overbalances the weight 18, under the weight of the water, the supply of water through the pipe 14 is again cut off. It might be further stated that a stop pin 19 extends from the supply tank and prevents the trough 15 from moving upwardly too far, to overbalance the trough by the action of the weight 18.

I claim:

1. A stock watering trough comprising a supply tank, a pipe leading from the tank, a trough section pivotally mounted on the pipe near one end of the trough section, a weight at one end of the trough to hold the trough section in a horizontal position when empty, said trough section adapted to swing downwardly under the weight of water in the trough section, and means controlled by the downward movement of the trough for cutting off the flow of water to the trough.

2. A stock watering trough comprising a supply pipe, a trough section pivotally mounted on the pipe, near one end of the trough section, a weight for normally urging one end of the trough section downwardly, means for restricting movement of the trough section under the action of the weight, a curved pipe extending from the supply pipe and adapted to discharge water into the trough section, means in the trough section for closing the discharge end of the curved pipe when the trough section swings downwardly under the action of the water in the trough section.

3. A stock watering trough comprising a supply tank, a supply pipe leading from the tank, a trough section pivotally mounted on the pipe adjacent to one end of the trough section, means at one end of the trough section to overbalance one end of the trough section when the trough section is empty, means for limiting pivotal movement of the trough section in one direction, one end of said trough section adapted to swing downwardly under the weight of water discharged into the trough section, and means controlled by the downward movement of the trough section, for regulating the flow of water to the trough section.

In testimony that I claim the foregoing as my own, I have hereto affixed my signature.

STANLEY G. ELLIS.